United States Patent
Sacca et al.

(10) Patent No.: US 6,714,645 B1
(45) Date of Patent: Mar. 30, 2004

(54) TELEPHONE LINE INTERFACE CIRCUIT WITHOUT HOOKSWITCH RELAY

(75) Inventors: Frank Sacca, Diamond Bar, CA (US); Charles F. Raasch, Lake Forest, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 555 days.

(21) Appl. No.: 09/618,336

(22) Filed: Jul. 18, 2000

(51) Int. Cl.$^7$ ................................................ H04M 1/00
(52) U.S. Cl. .................................................. 379/399.01
(58) Field of Search ........................ 379/399.01, 413.02, 379/390.04, 402, 400, 403, 404, 413, 413.01, 377, 380, 382

(56) References Cited

U.S. PATENT DOCUMENTS

| | | | | |
|---|---|---|---|---|
| 4,656,318 A | * | 4/1987 | Noyes | 379/372 |
| 4,723,267 A | * | 2/1988 | Jones et al. | 379/443 |
| 6,104,791 A | * | 8/2000 | Gizara et al. | 379/93.28 |
| 6,137,880 A | * | 10/2000 | Bella | 379/399.01 |
| 6,456,713 B1 | * | 9/2002 | Jauregui et al. | 379/399.01 |

* cited by examiner

Primary Examiner—Rexford Barnie
(74) Attorney, Agent, or Firm—Farjami & Farjami LLP

(57) ABSTRACT

A telephone line interface circuit which does not require a hookswitch relay is disclosed. An optoisolator is utilized to place a telephone line interface circuit on-hook and off-hook. In one embodiment, the optoisolator is controlled by an optoisolator control signal generated by a communications device such as a modem. An output of the optoisolator is coupled to an input of a DC control circuit. An output of the DC control circuit is coupled to a AC switch. When the optoisolator input control signal is activated, the optoisolator output enables voltage or current bias to the transistor, which places the telephone line interface circuit off-hook. When the optoisolator input control signal is deactivated, the optoisolator output disables voltage or current bias to the transistor, which places the telephone line interface circuit on-hook. In one embodiment, the DC control circuit is an electronic inductor comprising a pair of NPN transistors connected in a Darlington configuration. In one embodiment, the AC switch comprises a PNP transistor whose base is coupled to the output of the DC control circuit. In another embodiment the AC switch comprises an NPN transistor whose base is coupled to the input of the DC control circuit.

25 Claims, 4 Drawing Sheets

TELEPHONE LINE INTERFACE CIRCUIT WITHOUT HOOKSWITCH RELAY

The present application is related to a co-pending application entitled "Telephone Line Interface Circuit Without Hookswitch", filed on Dec. 16, 1998, Ser. No. 09/212,707, and assigned to the assignee of the present application. The disclosure in that co-pending application is hereby fully incorporated by reference into the present application.

BACKGROUND OF THE INVENTION

1. Field of the Invention

The present invention is generally in the field of telecommunications devices and circuits. More specifically, the invention is in the field of telephone line interface circuits.

2. Background Art

A hookswitch relay (also referred to as a "relay" in the present application) determines whether a telephone device is "off-hook" or "on-hook". This determination is made by allowing or disallowing DC telephone line current to flow through the telephone line interface circuit. Off-hook describes the condition when DC line current is allowed to flow through a telephone line interface circuit which can be coupled to a communications device such as a modem. On-hook describes the condition when DC line current is not allowed to flow through the telephone line interface circuit. The use of a hookswitch relay has been thus far generally considered an essential element in a telephone line interface circuit coupled to a communications device such as a modem.

FIG. 1 shows an exemplary telephone line interface circuit 100. System side device 102 (also referred to as SSD 102) is shown in block diagram form. SSD 102 can be part of a communications device such as a modem.

Coupling transformer 106 comprises primary winding 120 and secondary winding 122. One terminal of primary winding 120 is connected to resistor 104 at node 101. The other terminal of primary winding 120 is connected directly to TXA2 of SSD 102. Secondary winding 122 has one terminal connected to capacitor 110. The other terminal of secondary winding 122 is connected to the ring terminal of the telephone line at node 111. Resistor 104 has one terminal connected to a terminal of primary winding 120 at node 101. The other terminal of resistor 104 is connected to TXA1 of SSD 102.

One terminal of capacitor 110 is connected to one terminal of secondary winding 122. The other terminal of capacitor 110 is connected to one AC signal terminal of diode bridge 114 at node 107. One terminal of relay 116 is connected to one AC signal terminal of diode bridge 114 at node 107. The other terminal of relay 116 is connected to the "tip" terminal of the telephone line at node 109 (the telephone line is not shown in any of the Figures). In the present discussion, telephone line terminals tip and ring can be interchanged without affecting the operation of the telephone line interface circuit.

One AC signal terminal of diode bridge 114 is connected to relay 116 at node 107. The other AC signal terminal of diode bridge 114 is connected to the "ring" terminal of the telephone line at node 111. The DC positive terminal of diode bridge 114 (shown as "+") is connected to the DC positive terminal of electronic inductor 112 through line 162. The DC negative terminal of diode bridge 114 (shown as "−") is defined and referred to as DC ground.

The DC positive terminal of electronic inductor 112 is connected to the DC positive terminal of diode bridge 114 through line 162. The DC negative terminal of electronic inductor 112 is connected to DC ground through line 166. MOV 118 has one terminal connected to the tip terminal of the telephone line at node 109. The other terminal of MOV 118 is connected to the ring terminal of the telephone line at node 111.

Coupling transformer 106 provides isolation and impedance matching between SSD 102 and the telephone line. The value of resistor 104 is chosen to set a desired impedance of SSD 102 for properly interfacing with the telephone line. If coupling transformer 106 is assumed to be ideal, i.e., no losses due to the resistance in the transformer windings, resistor 104 is chosen to be 600 ohms so that the impedance seen by the telephone line looking into the telephone line interface circuit is 600 ohms. Capacitor 110 functions as a decoupling capacitor. Capacitor 110 essentially passes AC signals with frequencies over 10 Hz and blocks AC signals with frequencies less than 10 Hz, and, of course, blocks the DC component of the telephone line signal. This prevents any DC current from entering secondary winding 122 of coupling transformer 106, which is generally designed for linear operation without any DC current, i.e., coupling transformer 106 is a "dry" transformer. In the circuit of FIG. 1, the value of capacitor 110 can be 22 $\mu$F and can have a voltage rating of 62 volts.

Diode bridge 114 rectifies the telephone line voltage and current applied to electronic inductor 112. Since electronic inductor 112 is implemented with transistors, which are essentially polar devices, i.e., they require a DC bias of specific polarity to operate, diode bridge 114 is added to telephone line interface circuit 100 to ensure that a positive voltage and a negative voltage are always applied to the DC positive and DC negative terminals of electronic inductor 112, respectively, regardless of the line voltage polarity present at the tip and ring terminals of telephone line interface circuit 100. This avoids the possibility that incorrect wiring of a telephone wall jack will result in a malfunction of telephone line interface circuit 100 due to a polarity mismatch.

MOV 118 functions as a voltage surge suppressor. When the voltage across the tip and ring terminals of the telephone line exceeds approximately 300 volts, MOV 118 clamps the voltage at the tip and ring terminals of the telephone line to a maximum value, thus protecting electronic inductor 112.

Relay 116 allows current flow from the telephone line if relay 116 is closed. In other words, the telephone line interface circuit is off-hook. If relay 116 is open, there is an open circuit and therefore no current flow. In other words, the telephone line interface circuit is on-hook. Relay 116 is turned off and on by means of a relay control in SSD 102 (the connection between the relay control and relay 116 is not shown in FIG. 1). One reason Relay 116 is necessary to the circuit shown in FIG. 1 is because it is required that telephone line interface circuits, such as the circuit of FIG. 1, must comply with certain requirements for on-hook maximum current flow and AC impedance. Generally, the standard requires that on-hook DC current flow be less than 10 $\mu$A and that on-hook AC impedance be greater than 5 kilo ohms.

To meet these specifications, assuming a typical Central Office battery voltage of approximately 50 volts, a minimum resistance of 5 meg ohms is required between the tip and ring terminals of the telephone line interface circuit (50 Volts /10 $\mu$A=5 meg ohms) when the circuit is on-hook. Relay 116 has previously been used to meet this requirement by completely disconnecting the telephone line interface circuit from the telephone line. The resistance of an open circuit is infinite and therefore there is no current flow when relay 116 is open.

In FIG. 1, electronic inductor 112 is shown in block diagram form. When relay 116 is closed (i.e., in the off-hook state) current is allowed to flow from the telephone line tip and ring terminals through line 107 and 162 and into electronic inductor 112. Electronic inductor 112 sets the DC current value for the telephone line interface circuit.

The use of a relay hookswitch in telephone line interface circuits has disadvantages. One disadvantage of using a relay is its physical size. Relays are bulky and occupy a large space. Another disadvantage is that a relay requires a relatively large amount of power to be activated. In addition, the opening of a relay generally induces undesirable high-voltage spikes across its terminals. Also, a relay must completely disconnect the telephone line interface circuit from the telephone line to meet on-hook DC resistance and AC impedance requirements, which results in total signal isolation from the telephone line in the on-hook state. Moreover, a relay is a relatively expensive device.

Solid state relays have recently been introduced which are relatively small and self-contained compared to mechanical relays. However, these solid state relays must have excellent linearity characteristics and must withstand high voltages to be employed as a hookswitch. Therefore, the use of a solid state relay as a hookswitch generally increases the cost of a telephone line interface circuit even though it reduces physical size.

Accordingly, there is a need in the art for an improved telephone line interface circuit which does not require a hookswitch relay to place the telephone line interface circuit in the on-hook and off-hook states.

SUMMARY OF THE INVENTION

The present invention is a telephone line interface circuit which does not require a hookswitch relay. The invention eliminates the need for a bulky relay, thus saving space. In addition, high-voltage spikes induced across the relay's terminals when the relay opens are eliminated. Furthermore, the invention's telephone line interface circuit operates using less power than the telephone line interface circuits which use relays. Moreover, the invention's telephone line interface circuit is less expensive as compared with the telephone line interface circuits utilizing relays.

The invention uses a switch, preferably an optoisolator device, to place a telephone line interface circuit on-hook and off-hook. The optoisolator is not in series with the telephone line interface circuit with respect to the tip and ring terminals of the telephone line. In one embodiment, the optoisolator is controlled by a control signal generated by a communication device such as a modem. An output of the optoisolator is coupled to the input of a DC control circuit in a telephone line interface circuit. An output of the DC control circuit is coupled to a AC switch. When the optoisolator input control signal is activated, the optoisolator output enables voltage or current bias to the transistor, which places the telephone line interface circuit off-hook. When the optoisolator input control signal is deactivated, the optoisolator output disables voltage or current bias to the transistor, which places the telephone line interface circuit on-hook.

In one embodiment, the DC current control circuit is an electronic inductor comprising a pair of NPN transistors connected in a Darlington configuration. In one embodiment, the AC switch comprises a PNP transistor whose base is coupled to the output of the DC control circuit.

In another embodiment the AC switch comprises an NPN transistor in series with the secondary winding of the coupling transformer. The base of NPN transistor is driven by the optoisolator.

DETAILED DESCRIPTION OF THE INVENTION

The present invention is a telephone line interface circuit which does not require a hookswitch relay. The following description contains specific information pertaining to different types of configurations, components and implementations of the invention. One skilled in the art will recognize that the present invention may be practiced with configurations, components and implementations different from those specifically discussed in the present application. Moreover, some of the specific details of the invention are not discussed in order to not obscure the invention. The specific details not discussed in the present application are within the knowledge of a person of ordinary skills in the art.

The drawings in the present application and their accompanying detailed description are directed to merely example embodiments of the invention. To maintain brevity, other embodiments of the invention which use the principles of the present invention are not specifically described in the present application and are not specifically illustrated by the present drawings.

Figure 2A:
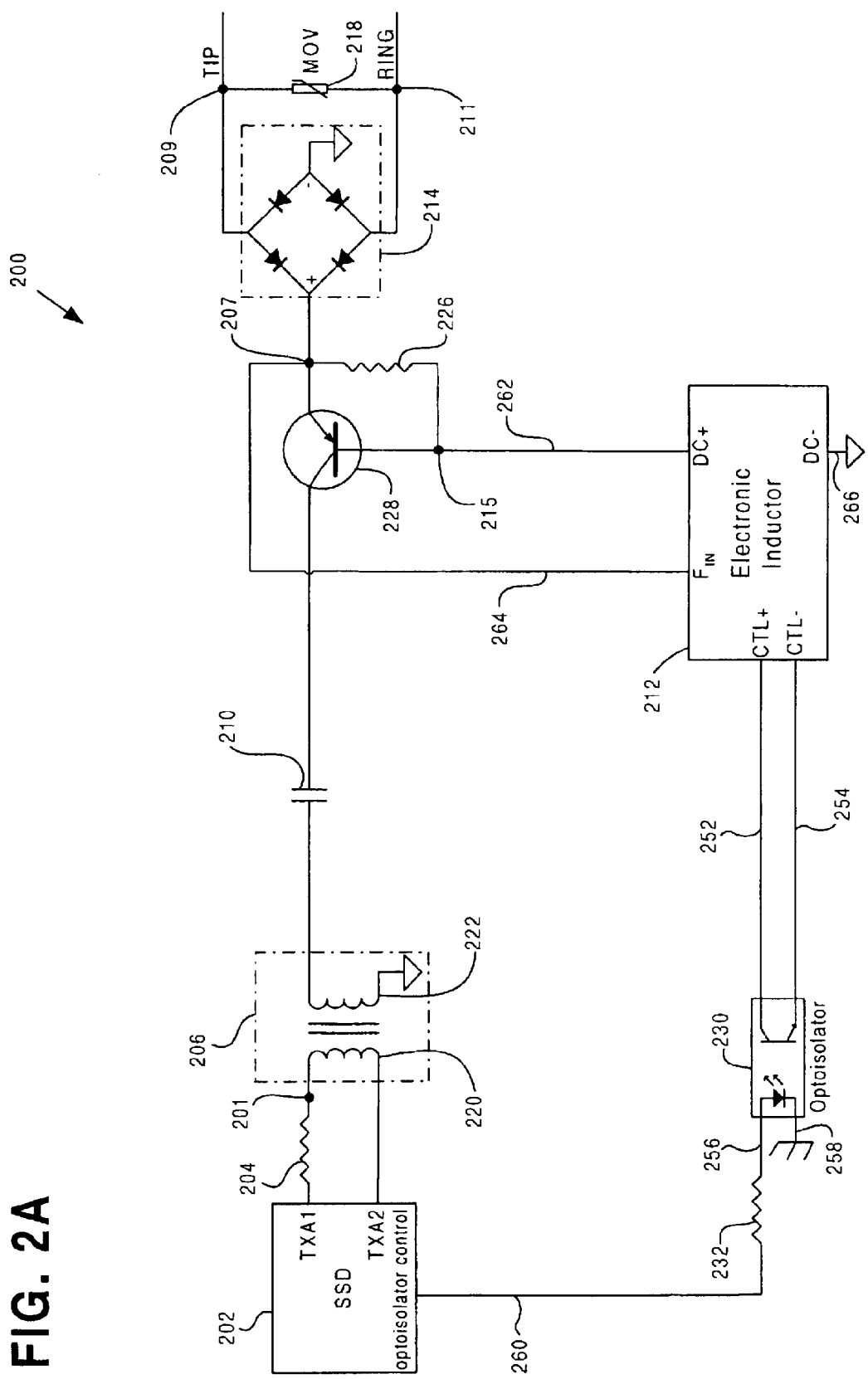
FIG. 2A illustrates the invention's telephone line interface circuit with an electronic inductor used as a DC current switch and a PNP transistor used as an AC switch.

FIG. 2A shows one embodiment of the invention's telephone line interface circuit 200. As can be seen in FIG. 2A, there is no relay in series with the telephone line terminal. In place of the relay, optoisolator 230 and transistor 228, along with resistor 232 and resistor 226, have been added to the invention's telephone line interface circuit.

System side device 202 (also referred to as SSD 202) is shown in block diagram form and can be part of a communications device such as a modem. The function and behavior of SSD 202 are well known in the art. Coupling transformer 206 comprises primary winding 220 and secondary winding 222. One terminal of primary winding 220 is connected to resistor 204 at node 201. The other terminal of primary winding 220 is connected directly to TXA2 of SSD 202. Secondary winding 222 has one terminal connected to capacitor 210. The other terminal of secondary winding 222 is connected to DC ground. Resistor 204 has a terminal connected to a terminal of primary winding 220 at node 201. The other terminal of resistor 204 is connected to TXA1 of SSD 202.

One terminal of capacitor 210 is connected to one terminal of secondary winding 222. The other terminal of capacitor 210 is connected to the collector of PNP transistor 228. The collector of transistor 228 is connected to a terminal of capacitor 210. The emitter of transistor 228 is connected to the DC positive terminal of diode bridge 214 at node 207. The base of transistor 228 is connected through line 262 to the DC positive terminal of electronic inductor 212. PNP transistor 228 is also referred to as the "AC switch" in the present application.

One terminal of resistor 226 is connected to the emitter of transistor 228 at node 207. The other terminal of resistor 226 is connected to the base of transistor 228 at node 215. As an example, the value of resistor 226 can be 50 kilo ohms.

One AC signal terminal of diode bridge 214 is connected to the tip signal of the telephone line at node 209. The other AC signal terminal of diode bridge 214 is connected to the ring terminal of the telephone line at node 211. The DC positive terminal of diode bridge 214 (shown as "+") is connected to the emitter of transistor 228 at node 207. The DC negative terminal of diode bridge 214 (shown as "−") is defined and referred to as DC ground. One terminal of MOV 218 is connected to the tip terminal of the telephone line at node 209. The other terminal of MOV 218 is connected to the ring terminal of the telephone line at node 211.

The DC positive terminal of electronic inductor 212 is connected to the base of transistor 228 at node 215 through line 262. The DC negative terminal of electronic inductor 212 is connected to DC ground through line 266. The feedback input terminal of electronic inductor 212, also referred to as $F_{IN}$ is connected to the emitter of transistor 228 at node 207 through line 264. Electronic inductor 212 is also connected to the outputs of optoisolator 230 on lines 252 and 254. Electronic inductor 212 is also referred to as a "DC control circuit" or a "DC current control circuit" in the present application. Each line 262 or line 266 is also referred to as an output of the DC control circuit or an output of the DC current control circuit. Each line 252 or 254 is also referred to as an input of the DC control circuit or an input of the DC current control circuit.

Figure 2B:
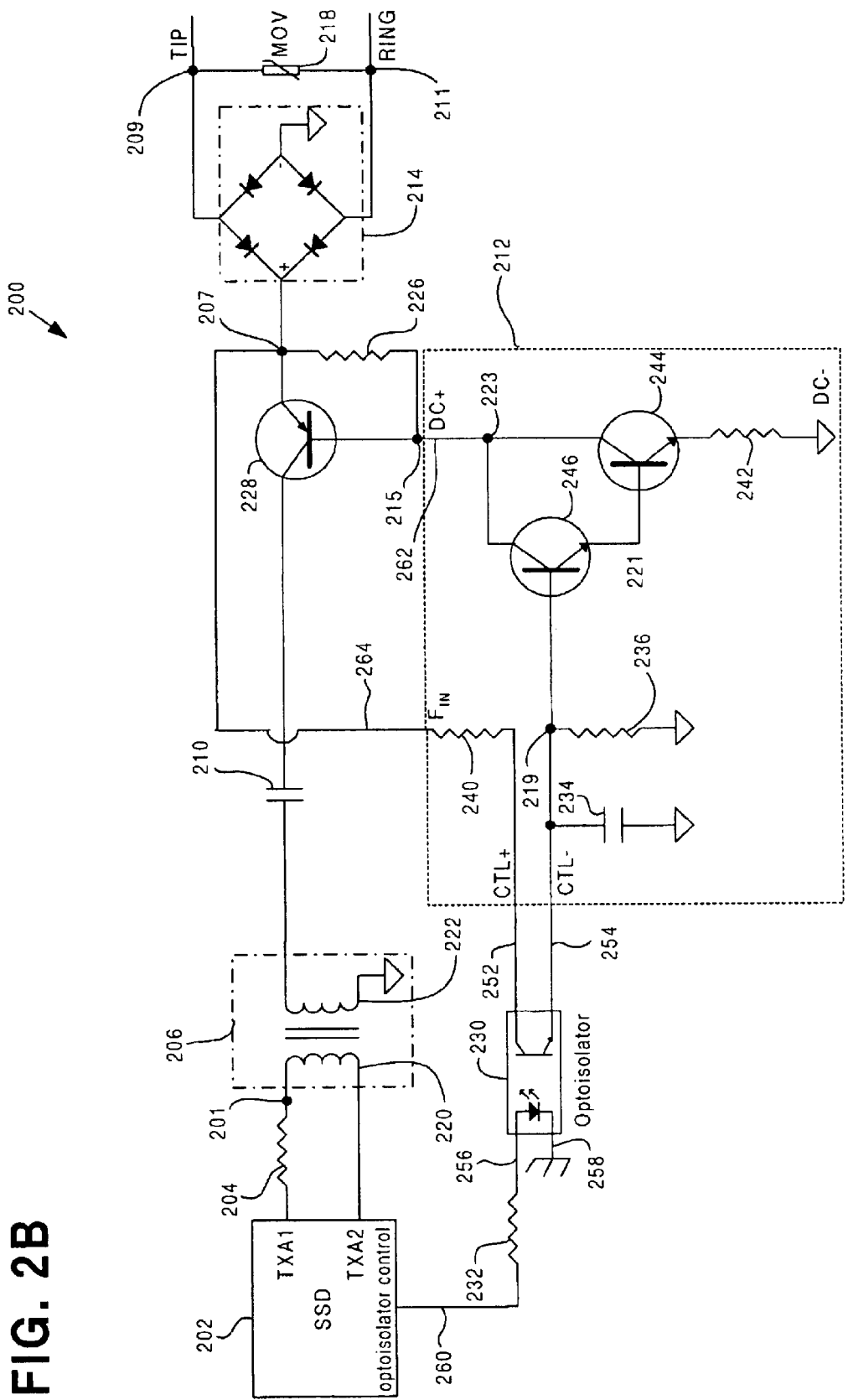
FIG. 2B illustrates the invention's telephone line interface circuit with an electronic inductor shown in detail.

The overall operation of the invention's telephone line interface circuit will now be discussed in relation to FIG. 2B. FIG. 2B shows the same telephone line interface circuit as shown in FIG. 2A. However, in FIG. 2B the various components of the electronic inductor are shown within a dashed line. The electronic inductor is generally referred to in FIG. 2B as electronic inductor 212.

Turning to electronic inductor 212, the collector of NPN transistor 246 is connected to the base of transistor 228 at node 223. The emitter of transistor 246 is connected to the base of NPN transistor 244. The base of transistor 246 is connected to one terminal of resistor 236 at node 219. The base of transistor 244 is connected to the emitter of transistor 246. The collector of transistor 244 is connected to the collector of transistor 246 at node 223. The emitter of transistor 244 is connected to a terminal of resistor 242.

One terminal of resistor 242 is connected to the emitter of transistor 244. The other terminal of resistor 242 is connected to DC ground. As an example, the value of resistor 242 can be 47 ohms. One terminal of resistor 240 is connected to CTL+of electronic inductor 212. The other terminal of resistor 240 is connected to the emitter of transistor 228 at node 207. One terminal of resistor 236 is connected to CTL−of electronic inductor 212. The other terminal of resistor 236 is connected to DC ground. One terminal of capacitor 234 is connected to one terminal of resistor 236 at node 219. The other terminal of capacitor 234 is connected to DC ground.

One output of optoisolator 230 is connected to one terminal of resistor 240 at the CTL+terminal of electronic inductor 212 through line 252. The other output of optoisolator 230 is connected to the base of transistor 246 through line 254 and the CTL−terminal of electronic inductor 212. One input terminal of optoisolator 230 is connected to one terminal of resistor 232 through line 256. The other input terminal of optoisolator 230 is connected to a ground shared by SSD 202 through line 258. One terminal of resistor 232 is connected to one input terminal of optoisolator 230 through line 256. The other terminal of resistor 232 is connected to optoisolator control (also referred to as the "optoisolator control signal" in the present application) through line 260. As an example, the value of resistor 232 can be 10 kilo ohms.

In a manner known in the art, coupling transformer 206 provides isolation and impedance matching between SSD 202 and the telephone line. The value of resistor 204 is chosen to arrive at a desired impedance of SSD 202 for properly interfacing with the telephone line. As an example, resistor 204 can be 600 ohms so that the impedance seen by the telephone line looking into the telephone line interface circuit will be approximately 600 ohms, assuming coupling transformer 206 is an ideal transformer. Capacitor 210 functions as a DC decoupling capacitor. Capacitor 210 prevents any DC current from entering secondary winding 222 of coupling transformer 206, as discussed above. As an example, the value of capacitor 210 can be 22 $\mu F$ with a voltage rating of 62 volts.

Diode bridge 214 rectifies the telephone line voltage and current applied to electronic inductor 212. Since electronic inductor 212 is implemented with transistors, which are essentially polar devices, i.e., they require a DC bias of specific polarity to operate, diode bridge 214 is added to telephone line interface circuit 200 to ensure that a positive voltage and a negative voltage are always applied to the DC positive and DC negative terminals of electronic inductor 212, respectively, regardless of the line voltage polarity present at the tip and ring terminals of telephone line interface circuit 200. This avoids the possibility that incorrect wiring of a telephone wall jack will result in a malfunction of telephone line interface circuit 200 due to a polarity mismatch.

MOV 218 functions as a voltage surge suppressor. When the voltage across the tip and ring terminals of the telephone line exceeds approximately 400 volts, MOV 218 clamps the voltage at the tip and ring terminals of the telephone line to a maximum value, thus protecting electronic inductor 112.

As can be seen in FIG. 2B, the optoisolator control signal is generated by SSD 202 which is part of a communications device such as a modem. When the optoisolator control signal is low, optoisolator 230 is turned off and does not allow DC current to pass from line 252 through optoisolator 230 to line 254. As stated above, output 252 of optoisolator 230 is connected to bias resistor 240, and output 254 of optoisolator 230 is connected to the base of transistor 246 of electronic inductor 212. The base of transistor 246 of electronic inductor 212 is also referred to generally as an input of electronic inductor 212, or as an input of the DC control circuit, or as an input of the DC current control circuit in the present application.

When optoisolator 230 is turned off, the base of transistor 246 is shorted to DC ground by pull-down resistor 236, and transistor 246 shuts off. Since transistor 246 is shut off, no current can flow into the base of transistor 244 and as such transistor 244 is also shut off. When transistors 246 and 244 are shut off, no DC current can pass through the respective collectors of transistors 246 and 244. Thus, no DC current can be conducted through line 262 which is coupled to the base of transistor 228. Since no DC current is allowed to be conducted through the base of transistor 228, that transistor (i.e. transistor 228) is shut off. When transistor 228 is shut off, its emitter cannot conduct any current to its collector, which effectively disallows any AC signal from reaching capacitor 210 (no DC current can flow into decoupling capacitor 210) from the telephone line. Thus, when transistors 246 and 244 are shut off, no DC current can flow from the telephone line to electronic inductor 212 through line 262. Moreover, transistor 228 is also shut off, which further blocks any AC current to coupling transformer 206 through capacitor 210. In other words, the telephone line interface circuit is placed on-hook.

As explained above, when transistors 244 and 246 are shut off, the telephone line interface circuit is on-hook and no DC leakage current can pass from the telephone line through line 262 into electronic inductor 212. Further, as described above, when the telephone line interface circuit is placed on-hook, transistor 228 is also shut off and no AC current can flow from the telephone line to electronic inductor 212 and coupling capacitor 210 and coupling transformer 206. Thus, the invention ensures that when telephone line interface circuit 200 is on-hook, no DC or AC leakage current passes to either electronic inductor 212 through line 262 or to coupling transformer 206 through capacitor 210, respectively.

As discussed above, on-hook current flow is required to be less than 10 μA. As also discussed above, when the telephone line interface circuit is placed on-hook, transistors 244 and 246 are shut off and will not allow any DC current to pass through. Thus, no DC current can flow from the telephone line to electronic inductor 212, and as such the 10 μA requirement is met.

Moreover, when the telephone line interface circuit is on-hook, transistor 228 is also shut off, effectively opening any AC signal path to coupling transformer 206, and the impedance seen by the telephone line looking into SSD 202 is much greater than 600 ohms. As such, the on-hook AC impedance requirement is also met when the telephone line interface circuit is placed on-hook.

When the optoisolator control signal is high, optoisolator 230 is turned on and DC current on line 252 can pass through optoisolator 230 to line 254. As stated above, one output of optoisolator 230 is connected to bias resistor 240 through line 252 and the other output of optoisolator 230 is connected to the base of transistor 246 of electronic inductor 212.

When optoisolator 230 is turned on, the base of transistor 246 at node 219 is at a DC bias voltage determined by the bias circuit comprised by resistors 240 and 236 (line 252 is shorted to line 254 by the output of optoisolator 230). Due to the DC bias voltage at its base, transistor 246 is turned on and injects current into the base of transistor 244. As such, transistor 244 also turns on. When transistors 246 and 244 are both on, DC current can pass through the respective collectors of transistors 246 and 244. Thus, DC current can be conducted through line 262 which is coupled to the base of transistor 228.

The bias circuit for transistors 246 and 244 also comprises-capacitor 234, as shown in FIG. 2B. Capacitor 234 bypasses to ground any AC signals present on line 264 and feeding through resistor 240. As an example, capacitor 234 can be 10 μF. In an alternative embodiment of the invention, not shown in FIG. 2B, capacitor 234 can be coupled directly to the terminal of resistor 240 which is connected to line 252, rather than to the base of transistor 246 at node 219 on line 254. This configuration lowers the time constant required for the electronic inductor to go on-hook, and can be beneficial to implement certain functions such as pulse dialing, for example.

Since DC current is conducted through the base of transistor 228, that transistor (i.e. transistor 228) is on. When transistor 228 is on, its emitter can conduct current to its collector. Thus, when transistors 246 and 244 are on, DC current can flow from the telephone line to electronic inductor 212 through line 262. Moreover, since transistor 228 is also on, AC current can flow into capacitor 210 to coupling transformer 206 (capacitor 210 blocks any DC current). In other words, the telephone line interface circuit is placed off-hook. It is noted that although steady-state DC current cannot flow into capacitor 210, a transient DC current will flow into capacitor 210 to charge up the capacitor, when switching state from on-hook to off-hook and vice versa.

Transistor 246 and transistor 244 of electronic inductor 212 are connected together in a Darlington configuration, whose function and behavior is known in the art. The Darlington configuration is preferred to a single-transistor configuration to increase current gain from the base to the collector of transistor 244. When optoisolator 230 is turned on, resistor 240 and resistor 236 act as a "voltage divider" and generate the voltage to bias transistor 246 and transistor 244. Resistor 240 and resistor 236 also provide DC voltage feedback to transistor 246 and transistor 244, which is necessary to set a DC current value for a given DC voltage value. The DC current value determined by this process is referred to as the "DC loop current". As an example, the value of resistor 240 can be 56 kilo ohms and the value of resistor 236 can be 36 kilo ohms. Alternatively, a single field-effect transistor (FET) with very high input impedance on its gate terminal can be used to replace both transistors 244 and 246, reducing the bias current requirement for electronic inductor 212.

In the present embodiment, transistor 246 and transistor 244 of electronic inductor 212 and transistor 228 are high-voltage transistors with a voltage rating of 400 volts. As examples, transistor 246 can be a CMPTA44 transistor, transistor 244 can be a CZTA44 transistor and transistor 228 can be a MPSA94 transistor. As discussed above, transistors 244 and 246 can be replaced by a single FET. As an example, the FET can be a D525, manufactured by Supertex.

High voltage transistors must be used in the present embodiment of the invention because transistors 246, 244 and 228 will be exposed to a potentially high voltage across the tip and ring of the telephone line. MOV 218 provides protection for transistors 246, 244, and 228 in case the voltage across the tip and ring terminals exceeds the 400 volts for which transistors 246, 244 and 228 are rated.

Figure 2C:
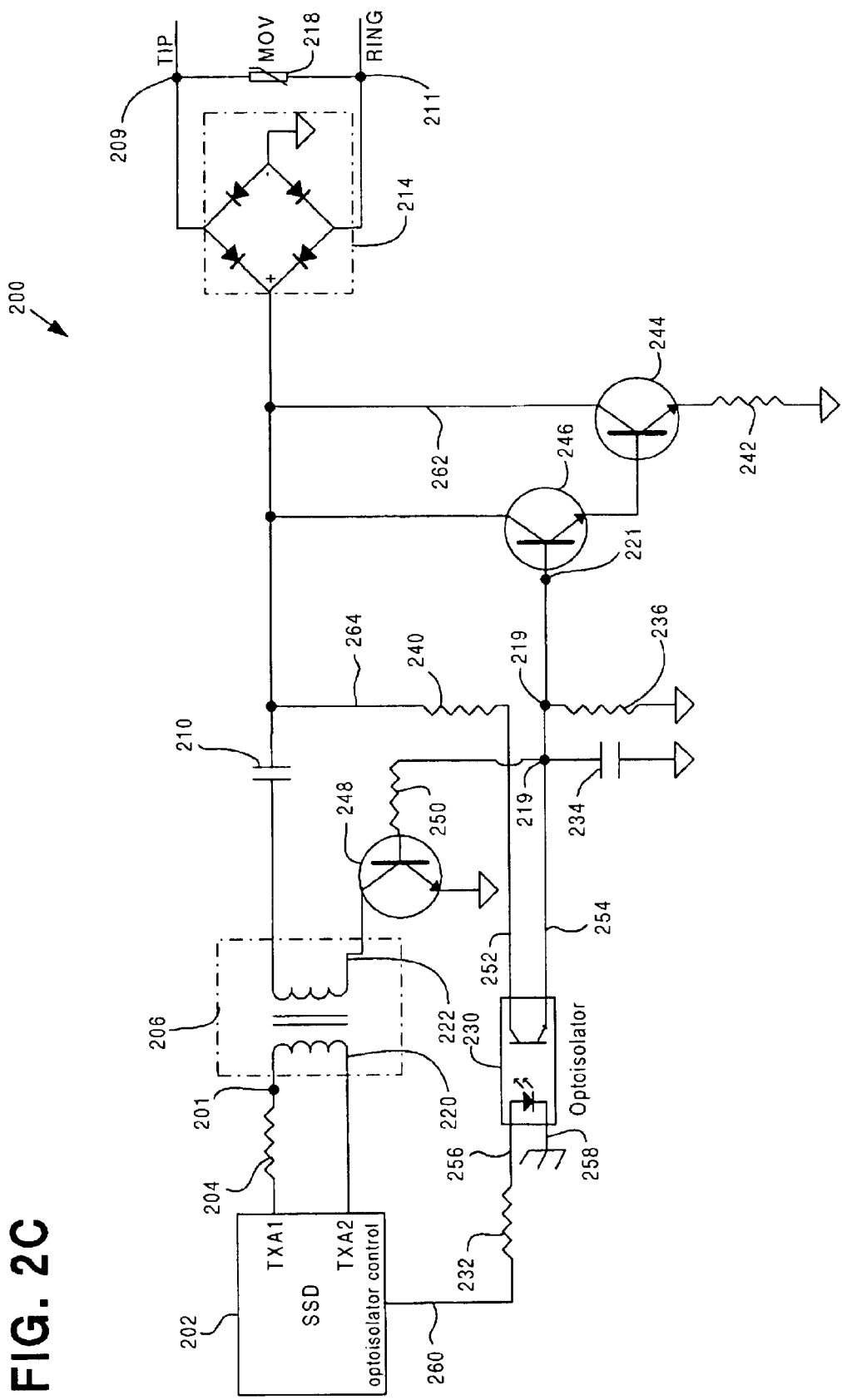
FIG. 2C illustrates an embodiment of the invention with an NPN transistor used as an AC switch.

FIG. 2C shows an alternative embodiment of the present invention, wherein PNP transistor 228 is replaced by NPN transistor 248. Since transistor 228 functions essentially as an AC switch, this transistor can be replaced by a less expensive NPN transistor connected in series with capacitor 210 and secondary winding 222 of coupling transformer 206. NPN transistor 248 is also referred to as an "AC switch" in the present application. The base of transistor 248 is connected to node 219 through base resistor 250 such that when transistors 246 and 244 are on, i.e., bias voltage is present at node 219, transistor 248 is also on and when transistors 246 and 244 are off, transistor 248 is also off. When transistor 248 is on, one terminal of secondary winding 222 of coupling transformer 206 is effectively referenced to ground and any AC signals on the transformer winding are coupled to the telephone line. When transistor 248 is off, its collector is floating and one terminal of secondary winding 222 of coupling transformer 206 is disconnected from the telephone line. Therefore, AC signals from coupling transformer 206 cannot be reflected to the telephone line. Also, when transistor 248 is off, the impedance seen by the telephone line looking into SSD 202 is much greater than 600 ohms. The configuration shown in FIG. 2C is particularly beneficial in cases where a "wet" transformer is used in a modem telephone line interface, in that capacitor 210 can be eliminated and the low-end frequency response of the interface improved (in addition to reducing cost). It should be noted that if a wet transformer is used in this configuration, the current through this transformer can be minimized to a small percentage of the current flowing through the electronic inductor. The current through the transformer can be limited, for example, by placing a resistor between the emitter of transistor 248 and ground. This effectively reduces linearity requirements for the transformer. Furthermore, as discussed above in relation to transistors 246 and 244 of electronic inductor 212, a FET can be substituted for transistor 248 to minimize bias current requirements.

Figure 1:
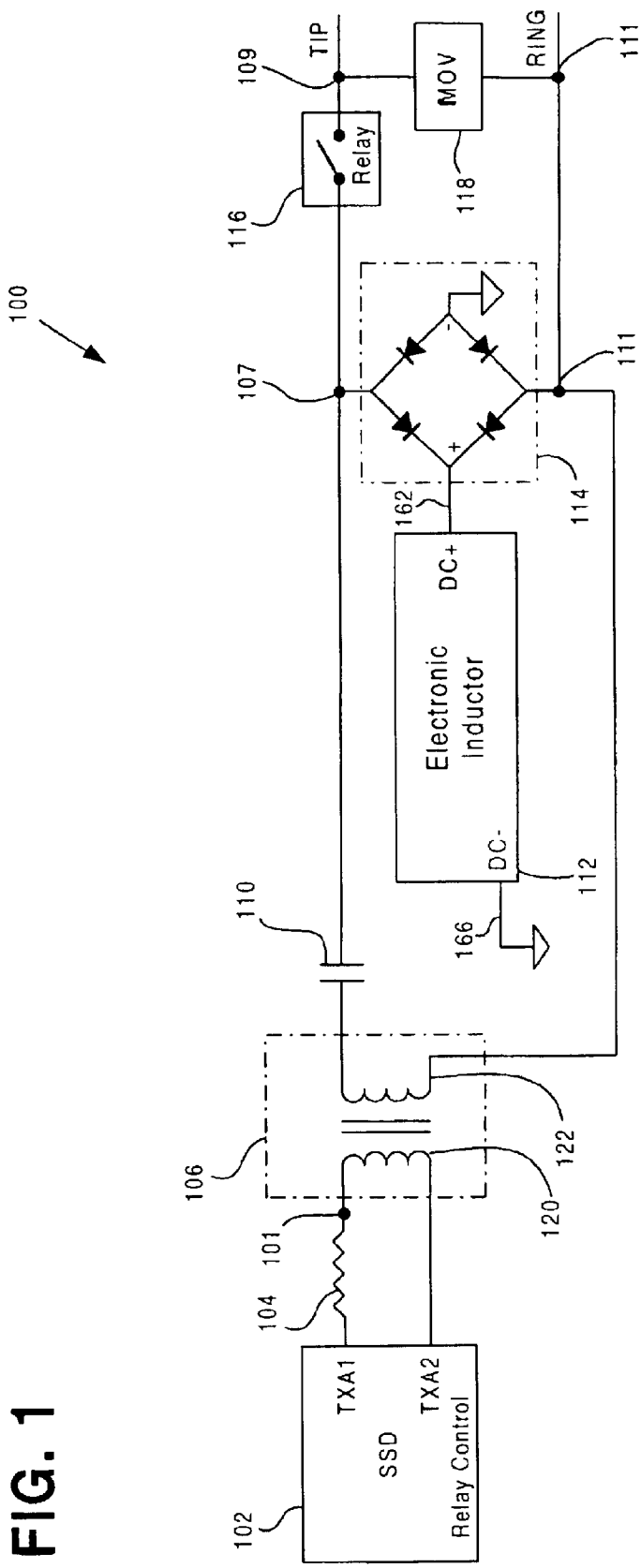
FIG. 1 illustrates an exemplary telephone line interface circuit utilizing a relay as a hookswitch.

Thus, it is seen that the invention eliminates the need for a relay to act as a hookswitch, in series with the telephone line terminals with respect to a modem telephone line interface. Therefore, the invention's telephone line interface circuit has many advantages over the telephone line interface circuit shown in FIG. 1. One advantage is that there is no need for a bulky mechanical relay, thus saving space, or for a solid-state relay with excellent linearity characteristics, which is difficult and expensive to achieve over the range of currents typical of the telephone line. In addition, strict high-voltage requirements for the optoisolator or relay are eliminated, as the current rating can be decreased substantially to a factor of less then one hundred. Another advantage is that optoisolator 230 can be activated with less power than a relay. Moreover, optoisolator 230 is relatively inexpensive compared to relay 116 and results in significant cost savings.

Thus, an improved telephone line interface circuit which does not require a hookswitch relay in series with the telephone line terminals to determine on-hook or off-hook status has been described.

What is claimed is:

1. A telephone line interface circuit configured to be coupled to a telephone line, said telephone line having tip and ring terminals, said telephone line interface circuit comprising:
   an optoisolator having an input and an output, said optoisolator not in series with said tip and ring terminals of said telephone line;
   an optoisolator control signal coupled to said input of said optoisolator;
   said output of said optoisolator being coupled to an input of a DC current control circuit, said output of said DC current control circuit being coupled to a transistor for placing said telephone line interface circuit on-hook and off-hook.

2. The telephone line interface circuit of claim 1 wherein said transistor operates as an AC switch, said AC switch placing said telephone line interface circuit on-hook and off-hook.

3. The telephone line interface circuit of claim 1 wherein said DC current control circuit comprises an electronic inductor.

4. The telephone line interface circuit of claim 2 wherein said AC switch comprises a PNP transistor and wherein said output of said DC current control circuit is coupled to a base of said PNP transistor.

5. The telephone line interface circuit of claim 1 wherein said telephone line interface circuit is coupled to a modem.

6. The telephone line interface circuit of claim 1 wherein said optoisolator control signal is generated by-a modem.

7. The telephone line interface circuit of claim 5 wherein said optoisolator control signal is generated by said modem.

8. The telephone interface circuit of claim 3 wherein an output of said electronic inductor is coupled to said transistor, wherein said transistor operates as an AC switch, said AC switch placing said telephone line interface circuit on-hook and off-hook.

9. The telephone line interface circuit of claim 8 wherein said AC switch comprises a PNP transistor and wherein said output of said electronic inductor is coupled to a base of said PNP transistor.

10. A telephone line interface circuit configured to be coupled to a telephone line, said telephone line having tip and ring terminals, said telephone line interface circuit comprising:
    an optoisolator having an input and an output, said optoisolator not in series with said tip and ring terminals of said telephone line;
    a DC current control circuit having an input and an output, said output of said optoisolator being coupled to said input of said DC current control circuit, said output of said DC current control circuit being coupled to an AC switch for placing said telephone line interface circuit on-hook and off-hook.

11. The telephone line interface circuit of claim 10 wherein said DC current control circuit comprises an electronic inductor.

12. The telephone line interface circuit of claim 10 wherein said AC switch comprises a PNP transistor and wherein said output of said DC current control circuit is coupled to a base of said PNP transistor.

13. The telephone line interface circuit of claim 10 wherein said telephone line interface circuit is coupled to a modem.

14. The telephone line interface circuit of claim 10 wherein an optoisolator control signal is coupled to said input of said optoisolator.

15. The telephone line interface circuit of claim 14 wherein said telephone line interface circuit is placed off-hook when said optoisolator control signal is low and wherein said telephone line interface circuit is placed on-hook when said optoisolator control signal is high.

16. The telephone line interface circuit of claim 15 wherein said optoisolator control signal is generated by a modem.

17. The telephone line interface circuit of claim 13 wherein said optoisolator control signal is generated by said modem.

18. A telephone line interface circuit configured to be coupled to a telephone line, said telephone line having tip and ring terminals, said telephone line interface circuit comprising:
    an optoisolator having an input and an output, said optoisolator not in series with said tip and ring terminals of said telephone line;
    an optoisolator control signal coupled to said input of said optoisolator;
    said output of said optoisolator being coupled to an input of an AC switch, wherein an output of said AC switch places said telephone line interface circuit on-hook and off-hook.

19. The telephone line interface circuit of claim 18 wherein said output of said AC switch is connected to a coupling transformer.

20. The telephone line interface circuit of claim 19 wherein said coupling transformer places said telephone line interface circuit on-hook and off-hook in response to said output of said AC switch.

21. The telephone line interface circuit of claim 18 where said AC switch comprises an NPN transistor.

22. The telephone line interface circuit of claim 20 wherein said AC switch comprises an NPN transistor.

23. The telephone line interface circuit of claim 18 wherein said telephone line interface circuit is coupled to a modem.

24. The telephone line interface circuit of claim 18 wherein said optoisolator control signal is generated by a modem.

25. The telephone line interface circuit of claim 20 wherein said telephone line interface circuit is coupled to a modem.

* * * * *